United States Patent
Kwan (10) Patent No.: US 12,346,623 B2
(45) Date of Patent: Jul. 1, 2025

(54) SYSTEM, APPARATUS, AND METHODS FOR DIGITALLY LABELING MEMORY DEVICES WITHOUT AFFECTING DATA STORAGE

(71) Applicant: MEMORIC TECHNOLOGY, LLC, El Segundo, CA (US)

(72) Inventor: David D. Kwan, El Segundo, CA (US)

(73) Assignee: MEMORIC TECHNOLOGY, LLC, El Segundo, CA (US)

( * ) Notice: Subject to any disclaimer, the term of this patent is extended or adjusted under 35 U.S.C. 154(b) by 0 days.

(21) Appl. No.: 18/416,418

(22) Filed: Jan. 18, 2024

(65) Prior Publication Data
US 2024/0241684 A1 Jul. 18, 2024

Related U.S. Application Data

(60) Provisional application No. 63/439,647, filed on Jan. 18, 2023.

(51) Int. Cl.
*G06F 3/14* (2006.01)

(52) U.S. Cl.
CPC .................. *G06F 3/1431* (2013.01)

(58) Field of Classification Search
None
See application file for complete search history.

(56) References Cited

U.S. PATENT DOCUMENTS

| | | | |
|---|---|---|---|
| 7,791,489 B2 | 9/2010 | Gelbman et al. | |
| 8,040,594 B2 * | 10/2011 | Paolini, Jr. ............ | G09G 3/344 345/107 |
| 8,997,569 B2 | 4/2015 | Narita et al. | |
| 10,278,287 B2 | 4/2019 | Wilson et al. | |
| 11,227,203 B2 * | 1/2022 | Pruckner ................ | A61B 90/98 |
| 2006/0095647 A1 | 5/2006 | Battaglia et al. | |
| 2008/0061152 A1 * | 3/2008 | Shingai ............ | G06K 19/07703 235/492 |

(Continued)

FOREIGN PATENT DOCUMENTS

| | | |
|---|---|---|
| CN | 201134264 Y | 10/2008 |
| WO | 2021/185354 | 9/2021 |

OTHER PUBLICATIONS

Darksaber ("Lexar to use Electronic paper display on USB Stick"; Darksaber; "https://www.techpowerup.com/7767/lexar-to-use-electronic-paper-display-on-usb-stick"; 2006 hereinafter referred to as "Dark") (Year: 2006).*

*Primary Examiner* — Matthew Yeung
(74) *Attorney, Agent, or Firm* — K&L Gates LLP; Louis C. Cullman; Dennis A. Majewski (57) ABSTRACT

A system, apparatus, and methods for digitally labeling memory devices without affecting data storage are disclosed herein. The system, methods, and apparatus include a display device with a digital ink display mechanically coupled to a memory device. The display device is configured to be electrically isolated from the memory device to prevent discharge from the digital ink display or damage to the display device from affecting data storage quality of the memory device. The display device wirelessly receives label data from a user device for displaying on the digital ink display. In some embodiments, the display device is connected to or integrally formed with a case that at least partially encloses the memory device for protection.

19 Claims, 8 Drawing Sheets

(56) References Cited

U.S. PATENT DOCUMENTS

| | | |
|---|---|---|
| 2012/0286938 A1 | 11/2012 | Cote et al. |
| 2018/0300671 A1* | 10/2018 | Richardson ............ G06Q 10/08 |
| 2023/0012967 A1* | 1/2023 | Rössl ...................... H02J 50/10 |
| 2024/0012915 A1* | 1/2024 | Andon .................... G06F 1/163 |

* cited by examiner

SYSTEM, APPARATUS, AND METHODS FOR DIGITALLY LABELING MEMORY DEVICES WITHOUT AFFECTING DATA STORAGE

PRIORITY CLAIM

This application claims priority to and the benefit as a non-provisional application of U.S. Provisional Patent Application No. 63/439,647 filed Jan. 18, 2023, the entire contents of which are hereby incorporated by reference and relied upon.

BACKGROUND

Portable memory devices, such as universal serial bus ("USB") flash drives, Secure Digital™ ("SD") cards, micro-SD cards, hard disk drives ("HDDs"), and solid-state drives ("SSDs") typically include a printable area that allows a user to draw or write information that is indicative of stored contents. The printable area is relatively small and can usually only be written to once. Attempting to erase the printing oftentimes causes the ink to smudge or otherwise damages the printable area. As a result, the printed label on a memory device may not reflect its actual contents when the memory device is erased or rewritten. In many instances, uses neglect to even use the printable area.

There are known portable memory devices that include a digital or electronic ink screen, which enable information to be displayed even when a power source is not present. These known devices communicatively couple the digital ink screen to the circuitry of the memory device to show, for example, an available capacity. In some instances, a user may enter text for display on the digital ink screen using a user device that also stores data to the memory device. An issue with these known portable memory devices is that the charged micro-capsules used to retain the display of information on the digital ink screen when power is not present may sometime discharge overtime. This discharge may propagate into the circuity of the memory device, thereby affecting the quality or reliability of the data storage.

SUMMARY

A system, methods, and apparatus for digitally labeling memory devices without affecting data storage are disclosed herein. The system, methods, and apparatus disclosed herein include a memory device such as a USB flash drive, an SD card, a micro-SD card, a HDD, or a SSD. The system, methods, and apparatus also include a display device that is mechanically coupled to the memory device. The display device includes a digital ink screen and corresponding control and power circuitry. The display device is configured to receive wireless signals of a certain short-range wireless protocol including, for example, near-field communication ("NFC"), radio frequency ("RF") communication, or Bluetooth®. The display device converts the wireless signals into a regulated output voltage and data for causing the digital ink screen to display the data even when the wireless signals are stopped or a power source is not available.

While mechanically connected, the display device is not electrically or communicatively coupled to the memory device. This separation prevents discharges or general operation of the display device from negatively affecting the data storage of the memory device. In some embodiments, an insulator or a clay adhesive is placed between the memory device and the display device to further provide data protection.

The display device is configured for local wireless coupling with a smartphone or tablet computer. In some embodiments, the display device and the smartphone or tablet computer form an inductive pair to facilitate the wireless transmission of power and data. The smartphone or tablet computer may include an application that is configured to prompt or otherwise receive label text, which is transmitted to the display device via the wireless signals for display on the digital ink screen. The disclosed system, methods, and apparatus accordingly provide a label for a memory device that may be rewritten without affecting the quality or reliability of the data storage.

In some embodiments, the memory device may be permanently or removably enclosed within a case, such as a silicone sleeve, a silicone case, a protective case, etc. The display device is embedded or otherwise connected to an exterior surface of the case. The case protects the memory device while at the same time conveying the contents of the memory device via the display device. Further, the silicon, rubber, or other protective material between the memory device and the display device prevents noise or other electrical signals from the memory device from reaching or otherwise affecting the display device, and vice versa.

In an aspect, any of the features, functionality and alternatives described in connection with any one or more of FIGS. 1 to 5 may be combined with any of the features, functionality and alternatives described in connection with any other of FIGS. 1 to 6C.

In light of the present disclosure and the above aspects, it is therefore an advantage of the present disclosure to provide a display device that is electrically isolated from an attached memory device to prevent damage to stored data.

It is another advantage of the present disclosure to use a removable display device with the memory device to enable replacement when the display device is damaged.

It is another advantage of the present disclosure to provide a display device that enables a label on a memory device to be rewritten and retain a textual display when a power source is removed.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

A system, methods, and apparatus for digitally labeling memory devices without affecting data storage are disclosed herein. The system, methods, and apparatus include a display device with a digital ink display mechanically coupled to a memory device. The display device is configured to be electrically isolated from the memory device to prevent discharge from the digital ink display or damage to the display device from affecting data storage quality of the memory device.

Reference is made herein to the display device being attached to a SSD or a HDD memory device. It should be appreciated that the display device may be connected to any memory device, such as a SD card, a micro-SD card, a HDD, a SSD, or a USB stick. Further, the display device may be connected to a case for enclosing a memory device, such as a compact disk case, an audio cassette, a video game case, or a movie case. Further, the display device may be connected to other media, such as cards and cassettes used by a laboratory analyzer.

I. Example Data Labeling System

Figure 1:
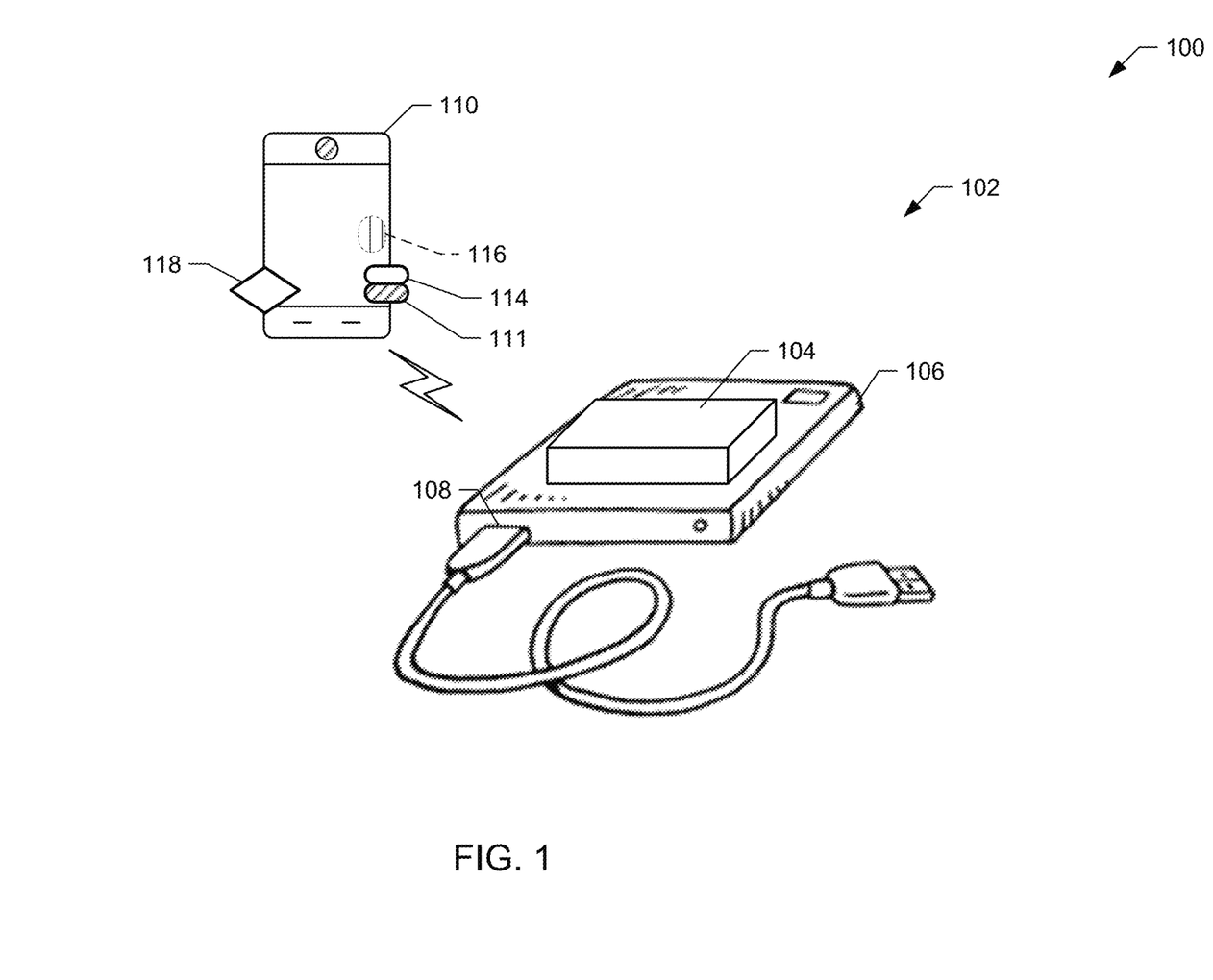
FIG. 1 is a diagram of a data labeling system including a user device and a display device connected to a memory device, according to an example embodiment of the present disclosure.

FIG. 1 illustrates a diagram of a data labeling system 100, according to an example embodiment of the present disclosure. The data labeling system 100 includes an apparatus 102 comprising a display device 104 and a memory device 106. In the illustrated example, the display device 104 is mechanically coupled to the memory device 106 via an adhesive, such as a clay adhesive. The display device 104 may be removable to enable easy replacement when broken or damaged.

In some embodiments, the apparatus 102 includes an insulator placed between the memory device 106 and the display device 104. The insulator may be integrally formed with an underside of the display device 104 or a top side of the memory device 106. The insulator is configured to prevent or reduce a strength of wireless signals from a user device 110 from affecting the quality or reliability of data stored on the memory device 106. The insulator is also configured to prevent current from propagating from the display device 104 to the memory device 106 or vice versa.

The memory device 106 includes one or more internal memory cells for storing data. The cells may include random access memory ("RAM"), read only memory ("ROM"), flash memory, magnetic disk(s), optical memory, or other storage media. The memory device 106 also includes a connector 108 for communicatively coupling with the user device 110 or another user device for receiving data for storage or transmitting data from storage. The connector 108 may include a female USB-C port that couples via a cable to the user device 110, which reads data from or writes data to the memory device 106. The memory device 106 may include any external memory device or storage module. In some embodiments, the connector 108 may be replaced with a wireless transceiver for wireless communicating data via a Bluetooth® protocol, a Wi-Fi protocol, a NFC protocol, a WLAN protocol, a Zigbee® protocol, etc.

The user device 110 includes a device such as a smartphone, a tablet computer, a laptop computer, a desktop computer, a workstation, etc. The user device 110 comprises a processor 111 and a memory 114, which stores instructions defining an application 116. Execution of the instructions by the processor 111 causes the application 116 to perform the operations described herein. The user device 110 also includes a display screen and a housing.

The user device 110 further includes short-range communication circuitry 118, which may include an antenna, a transceiver, etc. for communicating via RF, NFC, Bluetooth®, etc. For NFC, the circuitry 118 may include a transceiver communicatively coupled to a half-inductor, which forms a full inductor when brought into close proximity with a half-inductor located within the display device 104. The use of the half-inductor enables the circuitry 118 to magnetically couple to the display device 104 to facilitate the transfer of wireless signals providing power and data 112. In other words, the devices communicate through inductive coupling via induced magnetic fields between transmit and receive coils (loop antennas). To enhance the efficiency of wireless power transfer, the circuitry 118 and the display device 104 uses magnetic materials with superb properties such as high permeability, low magnetic loss, and high resistivity.

Figure 2:
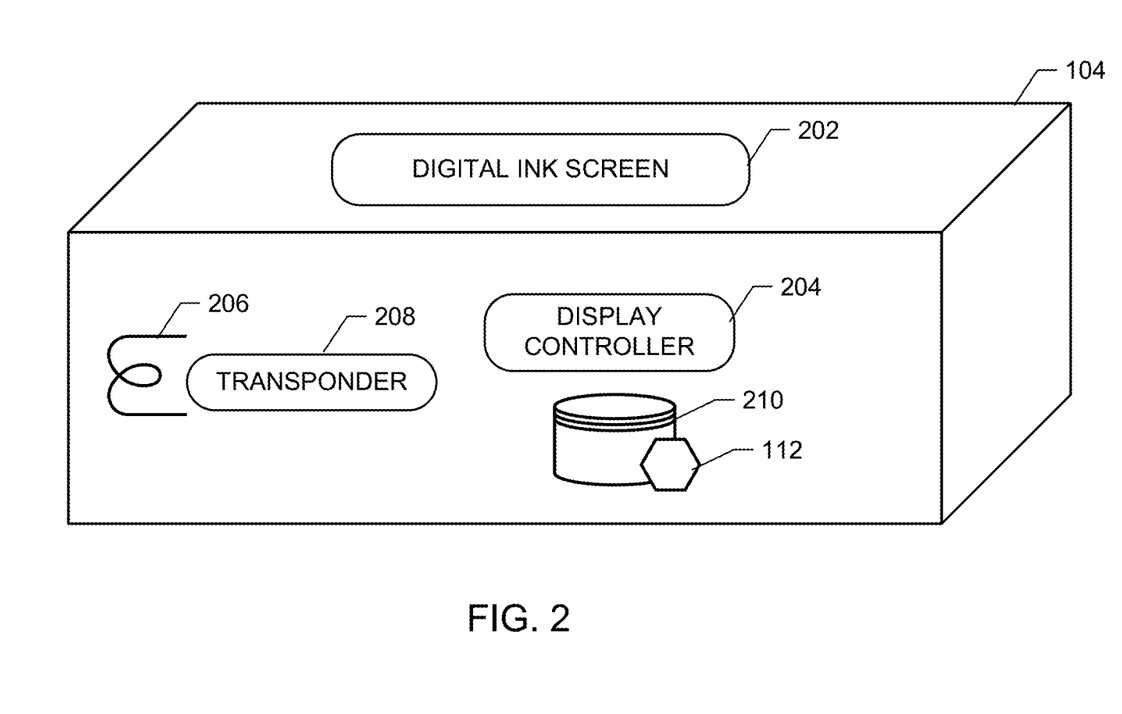
FIG. 2 is a diagram of the display device of FIG. 1, according to an example embodiment of the present disclosure.

FIG. 2 is a diagram of the display device 104 of FIG. 1, according to an example embodiment of the present disclosure. The display device 104 includes a digital ink screen 202 comprising pixels having micro-capsules containing at least two differently charged pigments. All of the micro-capsules may have the same color pigments. Alternatively, micro-capsules of different pixels may have different combinations of charged pigments. Such a configuration enables the digital ink screen 202 to display at least two different colors, and in some instances, up to ten different colors based on which pixels are activated.

For micro-capsules of a pixel with at least two charged pigments, a first pigment has a positive charge and a second pigment has a negative charge. An opaque gel or other fluid may be placed in a middle of the micro-capsules such that only pigments located at a top of the micro-capsules are visible. The micro-capsules are sandwiched between two electrode layers that enable pixel selection. Depending on which charge is applied to the electrode layers, the negative-charged pigments or the positive charged pigments propagate to a top of the micro-capsules while the other of the pigments propagates to a bottom of the micro-capsules. The pixel displays a color corresponding to which pigments are positioned at the top of the micro-capsules.

The display device 104 includes a display controller 204 configured to select which pixels are to display which colors. The display controller 204 transmits control signals on signal lines to select a charge polarity or voltage for each of the pixel electrodes, thereby selecting which pigments are viewable. The signal lines are provided in a cross-matrix format similar to how pixels for televisions and other screens are selected for displaying certain colors. The display controller 204 is configured to select the pixels based on received data from the user device 110. More specifically, the display controller 204 is configured to convert a string of alpha-numeric text characters or graphics into signal line commands such that pixels of the digital ink screen 202 display the text characters or graphics.

The display device 104 also includes a half-inductor 206 for receiving the data, via wireless signals, from the user device 110. As discussed above, the half-inductor 206 forms a full inductor with a half-inductor at the user device 110 when the user device is within proximity (e.g., ten centimeters) of the display device 104. The formation of a full inductor over an air gap enables the data to be transmitted via magnetic inductive coupling. In alternative embodiments, the half-inductor 206 is replaced with an antenna, such as a loop antenna for receiving RF signals to enable RF, Zigbee®, and/or Bluetooth® communication.

As shown in FIG. 2, the half-inductor 206 is electrically coupled to a transponder 208. The example transponder 208 includes one or more AC-DC converters that converts power from the harvested RF field via the half-inductor to a regulated output voltage, such as 3.3 or 5 volts. This regulated output voltage is used to power the display controller 204 and the digital ink screen 202. The transponder 208 also includes one or more AC-DC converters that converts the AC signal components into digital data.

In addition to the label text for display on the digital ink screen 202, the digital data may also include messages for establishing a communication connection and/or providing acknowledgement/fail messages. The display controller 204 is configured to process the digital data. For connection messages, the display controller 204 establishes a session connection with the user device 110. For label text, the display controller 204 transmits the appropriate command signals to the digital ink screen 202. The display controller 204 may be configured to differentiate between the different types of digital data based on coding within a message header.

The display device 104, in some embodiments, may include a memory 210. The memory 210 may receive power from the transponder 208. The memory 210, when used, is configured to store label data 112 in addition to the label data 112 being displayed by the digital ink screen 202. In other embodiments, the memory 210 is omitted.

Figure 3A:
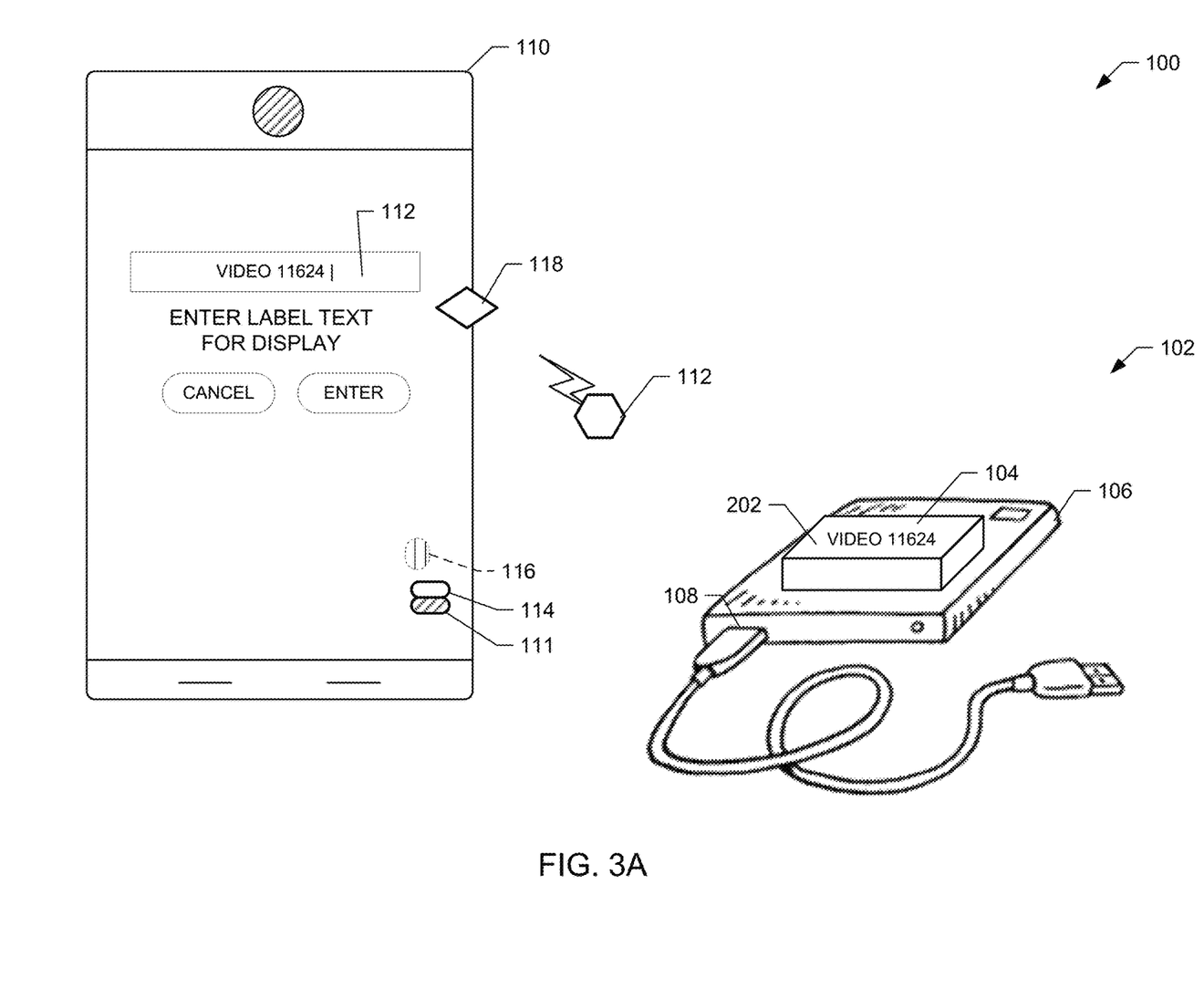
FIG. 3A is a diagram of an application on the user device for transmitting a label to the display device of FIGS. 1 and 2, according to an example embodiment of the present disclosure.

FIG. 3A is a diagram showing the creation of label data for the display device 104, according to an example embodiment of the present disclosure. In the illustrated example, the application 116 on the user device 104 displays a prompt and a data entry field for a user to enter text for a label. After selecting 'Enter', the application 116 establishes a connection with the display device 104 using, for example, NFC messaging protocols. The application 116 is then configured to transmit the entered text label as the label data 112 to the display device 104 via wireless signals, which are also used to power the display device 104. In some instances, the application 116 is configured to establish the connection with the display device 104 when the application 116 is opened on the user device 110 or a prompt is selected to establish communication.

As mentioned above, the display device 104 uses a portion of the wireless signals to generate power while converting the encoding within the wireless signals to the digital data. As shown in FIG. 3A, the display device 104 causes the entered label to be displayed on the digital ink screen. Even when the user device 110 stops transmitting wireless signals and power to the display device 104, the label text is still displayed. Such a configuration enables the memory device 106 to be labeled without affecting the data storage on the memory device.

Figure 3B:
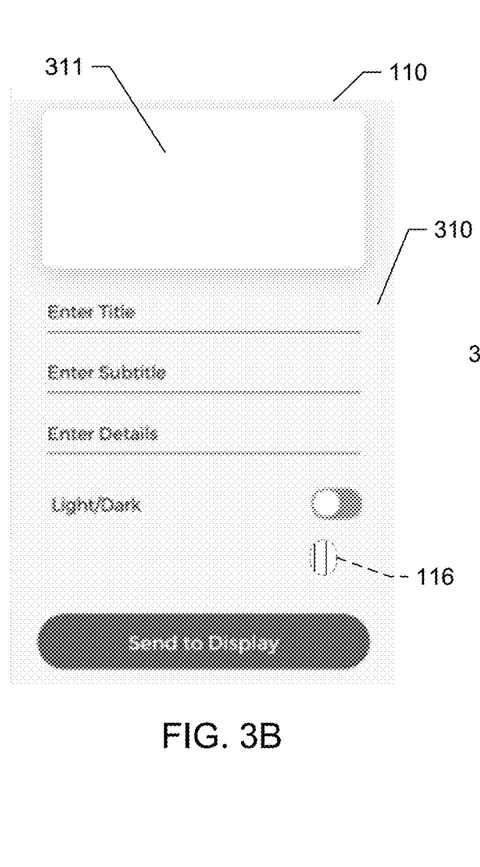
FIG. 3B is a diagram of an alternative embodiment of a user interface displayed by an application on the user devise to prompt a user for label data, according to an example embodiment of the present disclosure.

FIG. 3B is a diagram of an alternative embodiment of a user interface 310 displayed by the application 116 on the user devise 110 to prompt a user for label data, according to an example embodiment of the present disclosure. In this embodiment, the user interface 310 enables a user to enter a title, a subtitle, details, and an indication whether the text is to be displayed as light letters on a dark background or dark letters on a light background. The user interface 310 also includes a preview section 311 that shows how the entered data will appear on the display device 104. In some embodiments, the entered label data may be concurrently displayed by the display device 104.

Figure 3C:
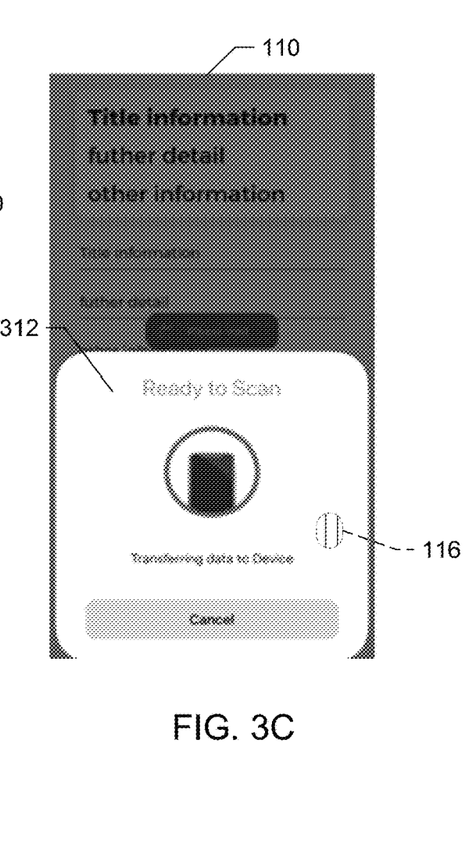
FIGS. 3C and 3D are diagrams of user interfaces showing a status of a transfer of the label data to the display device, according to an example embodiment of the present disclosure.
Figure 3D:
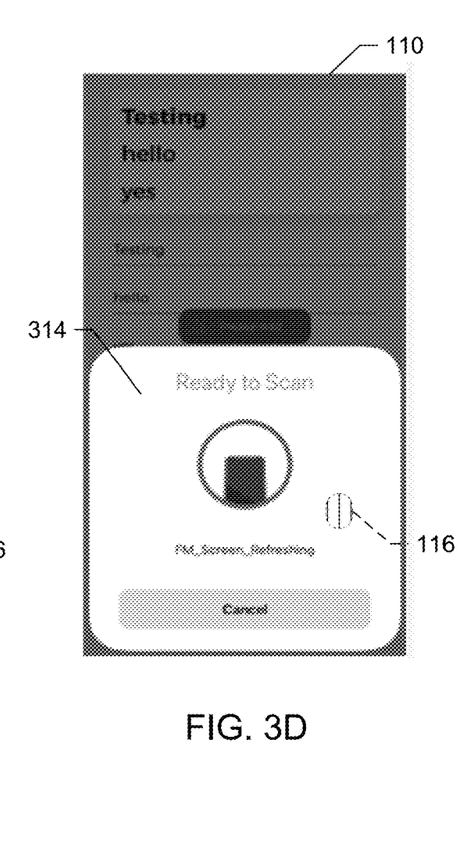

FIGS. 3C and 3D are diagrams of user interfaces 312 and 314 showing a status of the transfer of the label data 112 to the display device 104, according to an example embodiment of the present disclosure. The user interface 312 shows that a connection with the display device 104 has been established and the data transfer is in progress. The user interface 314 shows that the display device 104 is in the process of refreshing or writing the label data 112 to the digital ink display. When the label data 112 is successfully displayed, the application 116 may display a user interface that indicates the write is complete. When there is an error establishing a connection with the display device 104 or an error transferring/writing the label data 112, the application 116 is configured to display an error message.

II. Example Procedures for Writing Label Text

Figure 4:
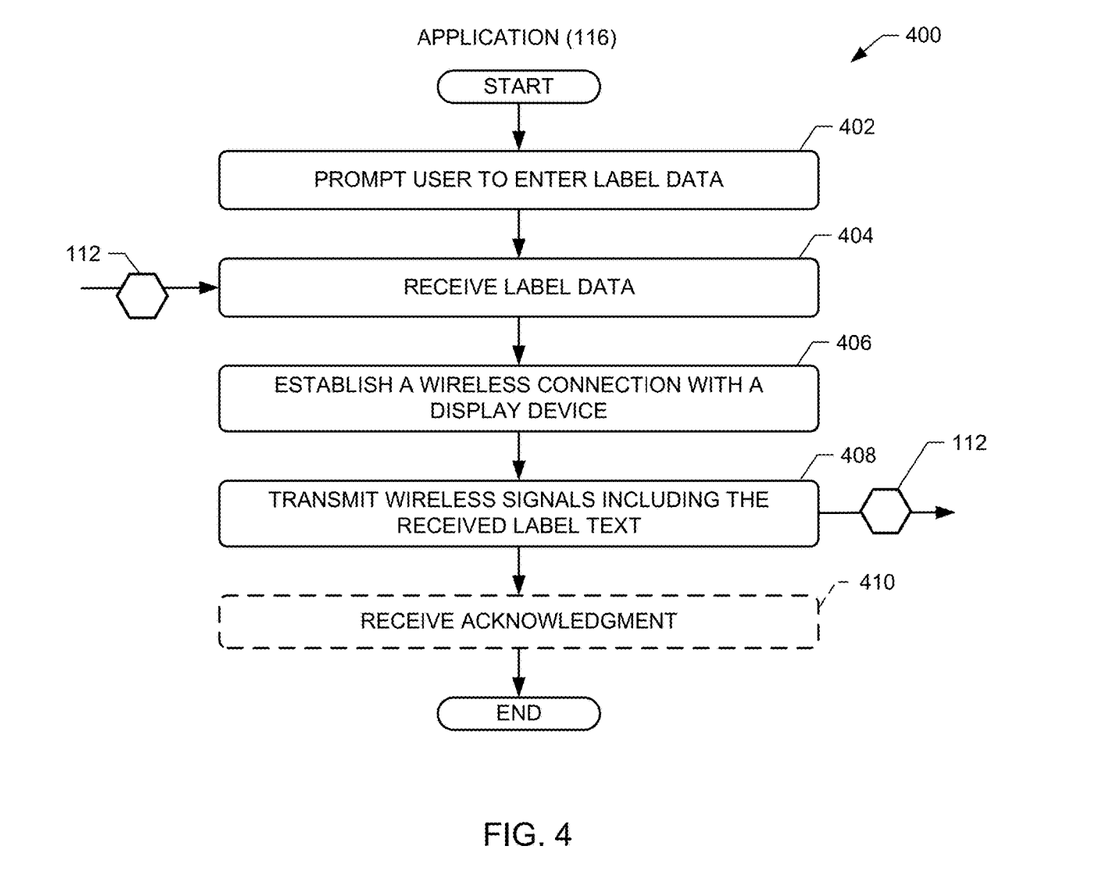
FIG. 4 is a diagram of an example procedure for transmitting label data to the display device of FIGS. 1 and 2, according to an example embodiment of the present disclosure.

FIG. 4 is a diagram of an example procedure 400 for transmitting label text data (e.g., label data 112) to the display device 104 of FIGS. 1 and 2, according to an example embodiment of the present disclosure. Although the procedure 400 is described with reference to the flow diagram illustrated in FIG. 4, it should be appreciated that many other methods of performing the steps associated with the procedure 400 may be used. For example, the order of many of the blocks may be changed, certain blocks may be combined with other blocks, and many of the blocks described may be optional. The actions described in procedure 400 are specified by one or more of the instructions 116 and may be performed among multiple devices including, for example, the user device 110 and the display device 104.

The procedure 400 begins when the application 116 of the user device 110 displays a prompt to enter label text for the memory device 106 (block 402). The application 116 may be launched on the user device 116. The application 116 then receives the label data 112 via one or more data fields (block 404). The application 116 next establishes a wireless connection with the display device 104 (block 406). This may include using NFC, RF, or Bluetooth® protocols to provision a wireless connection. When the display device 104 is not within range, the application 116 may display a prompt to bring the display device 104 closer to the user device 110. In some embodiments, the application 116 establishes a connection with the display device 104 when the application 116 is opened.

After establishing a connection, the application 116 transmits wireless signals to the display device 104 including the received label data 112 (block 408). In some embodiments, the application 116 may receive an acknowledgement message from the display device 104 indicative that the label data 112 was received and/or displayed on the digital ink screen 202 (block 410). In these embodiments, the application 116 displays a success message on the screen of the user device 110 to indicate the label was successfully displayed on the digital ink screen 202. In some embodiments, the acknowledgement step is omitted. When a fail message is received, the application 116 may prompt the user to transmit the label text data 112 again. After the label text data 112 is displayed on the display device 104, the example procedure 400 ends.

Figure 5:
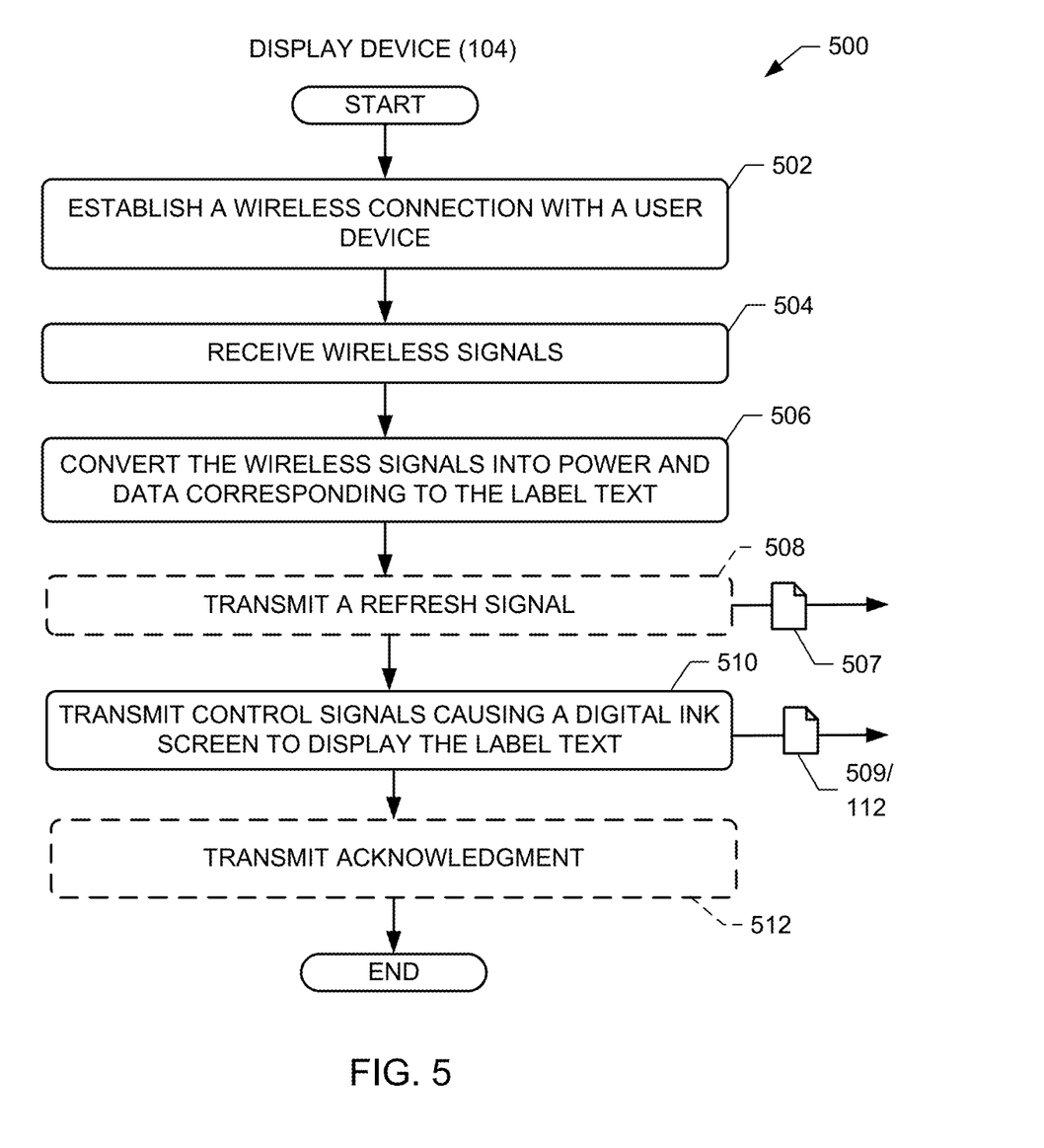
FIG. 5 is a diagram of an example procedure for displaying label data on a digital ink screen, according to an example embodiment of the present disclosure.

FIG. 5 is a diagram of an example procedure 500 for displaying the label data 112 on the digital ink screen 202, according to an example embodiment of the present disclosure. Although the procedure 500 is described with reference to the flow diagram illustrated in FIG. 5, it should be appreciated that many other methods of performing the steps associated with the procedure 500 may be used. For example, the order of many of the blocks may be changed, certain blocks may be combined with other blocks, and many of the blocks described may be optional. The actions described in the procedure 500 may be performed among multiple devices including, for example the user device 110 and the display device 104.

The example procedure 500 begins when the display device 104 receives a request to establish a connection with a user device 110 (block 502). After establishing a connection, the display device 104 receives wireless signals including label data 112 (block 504). The display device 104 converts the wireless signals into a regulated output voltage and the label data 112 (block 506). The display device 104 may also convert wireless signals into other commands or messages from the application 116 on the user device 110 to maintain the connection, erase previous label data, and/or write the new label data 112.

In some embodiments, the display device 104 transmits a refresh signal 507 to the digital ink screen 202 to reset the display or remove any ghost artifacts from a prior display of label data (block 508). The display device 104 next transmits control signals 509 to the digital ink screen 202 to cause the label data 112 to be displayed (block 510). After confirming the label data 112 was successfully conveyed to the digital ink screen 202, the display device 104 may transmit an acknowledgement message to the user device 110 (block 512). The example procedure 500 then ends. In some instances when the label data 112 cannot be displayed by the digital ink screen 202, the display device 104 may transmit a fail message.

III. Encasement Embodiment

Figure 6A:
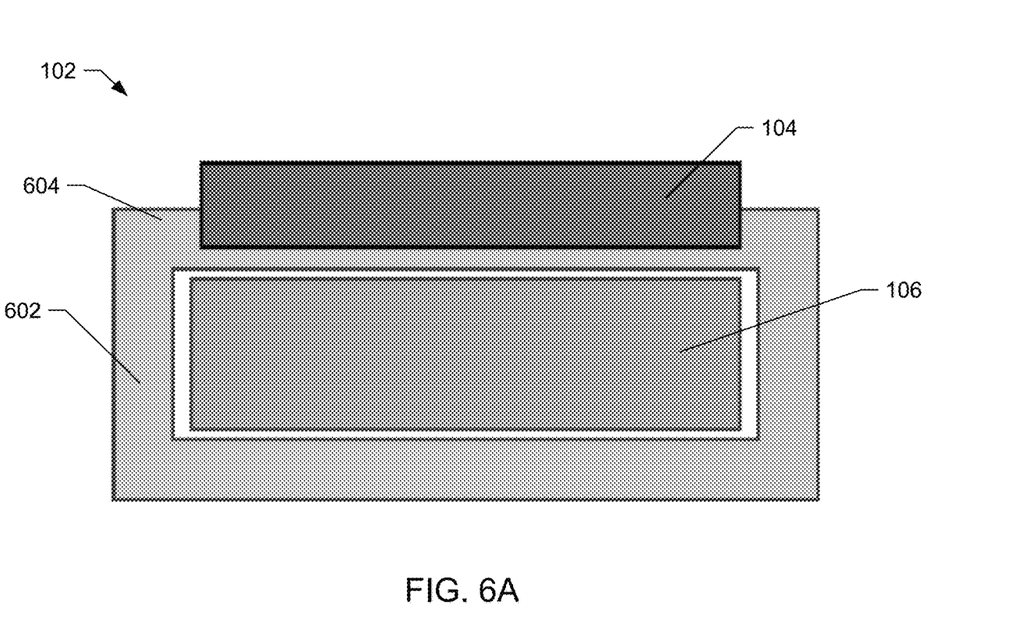
FIGS. 6A to 6C are diagrams of an example case with an integrated display device for enclosing the memory device, according to an example embodiment of the present disclosure.
Figure 6B:
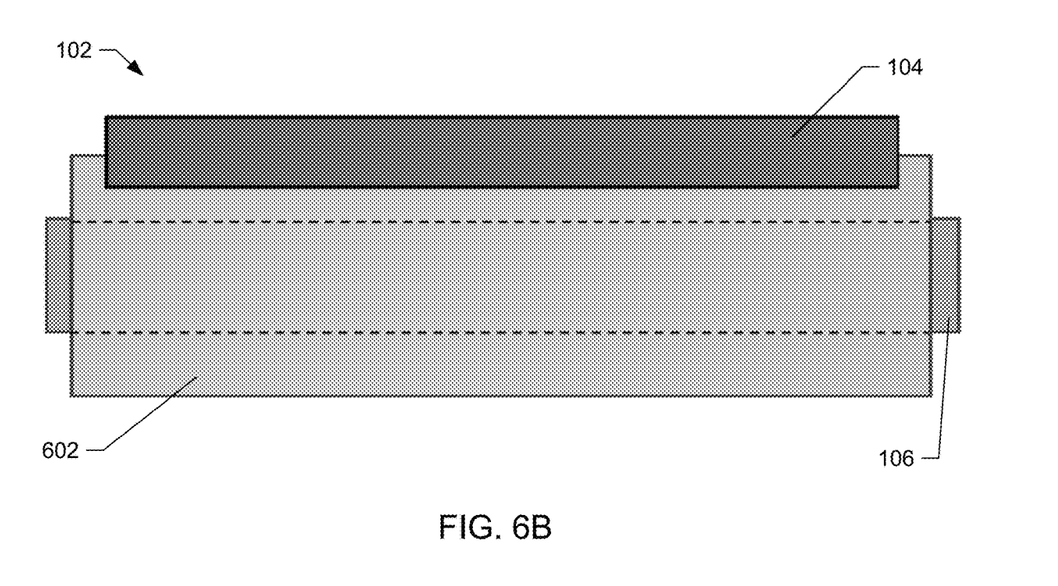
Figure 6C:
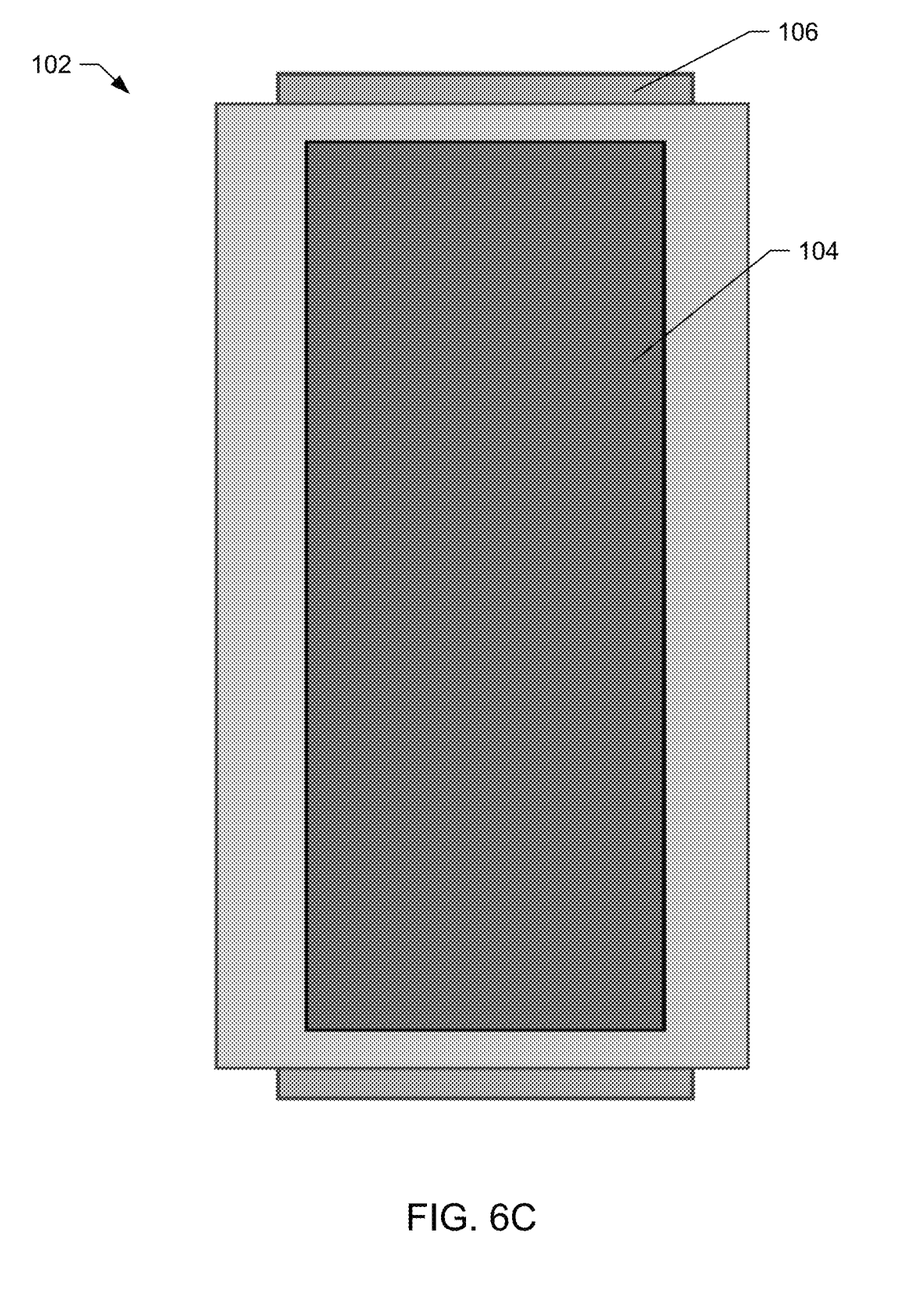

FIGS. 6A to 6C show diagrams of the display device 104 integrally formed with and/or connected to a case 602, according to an example embodiment of the present disclosure. FIG. 6A shows a front view of the apparatus 102 while FIG. 6B shows a side view and FIG. 6C shows a plan view. In the illustrated embodiment, the case 602 includes an exterior surface with a side 604 that includes a recess section configured to receive the display device 104. In other embodiments, the recess section is omitted and the display device 104 is integrally formed or otherwise connected to a flat surface of the side 604. In some instances, the display device 104 may be removable from the case 602.

The example case 602 may have elastomeric properties and be formed from silicon, rubber, soft plastics, hard plastics, and/or combinations thereof. In some embodiments, the case 602 may be in the form of a sleeve or a protective frame/enclosure. The case 602 is configured to at least partially enclose the memory device 106. As shown in FIGS. 6A and 6B, most of the memory device 106 is enclosed with only sides extending from the case 602. In other embodiments, the case 602 may completely enclose the memory device 106. Alternatively, the case 602 may cover less of the memory device 106. Further, the case 602 may include only one open end while the other end is closed.

As shown in FIG. 6A, there is a layer of the case 602 between the display device 104 and the memory device 106. The layer is configured to prevent electrostatic or current discharges from propagating from the display device 104 to the memory device 106 and vice versa. The layer of the case 602 may also reduce or eliminate wireless signals from reaching the memory device 106 when the user device 110 communicates with the display device 104.

The example case 602 is configured to enable the memory device 106 to be removed therefrom. In the illustrated example, a user may slide the memory device 106 through the side openings of the case 602 to remove the memory device 106. Accordingly, the case 602 and the display device 104 may be used with different memory devices 106.

The example case 602 is configured to protect the memory device 106 from drops, dust, and environmental containments. The incorporation of the display device 104 with the case 602 enables a user to provide the label data 112 indicative of the contents of the memory device 106 in an easily displayable manner. In some embodiments, the case 602 may have a dark color that prevents a user from writing directly on the case. Instead, the display device 104 provides an indication of the contents. Further, when the case 602 is moved to another memory device 106, the display device 104 is rewritten with new label data 112 without damaging or altering the appearance of the case 602.

IV. CONCLUSION

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus comprising:
 a memory device configured to store first data; and
 a display device mechanically coupled to the memory device, the display device including:
   a digital ink screen including pixels having microcapsules containing at least two differently charged pigments,
   an antenna or a half-inductor configured to receive wireless signals from a user device,
   a transponder communicatively coupled to the antenna or the half-inductor and configured to convert the wireless signals into second data and a regulated output voltage, and
   a display controller configured to
     receive the regulated output voltage and the second data from the transponder, and
     transmit control signals to the digital ink screen causing at least some of the pixels to display a specified pigment corresponding to the received second data,
   wherein the mechanical coupling between the memory device and the display device provides electrical isolation that prevents the second data and the regulated output voltage from affecting a storage integrity or reliability of the first data.

2. The apparatus of claim 1, further comprising a memory communicatively coupled to the display controller and configured to store the second data.

3. The apparatus of claim 1 wherein the digital ink screen is configured to receive the regulated output voltage from the transponder.

4. The apparatus of claim 1, wherein the digital ink screen is at least one of electronic paper or an electrophoretic display.

5. The apparatus of claim 1, wherein the display device includes a housing to enclose the antenna, the transponder, and the display controller.

6. The apparatus of claim 5, wherein the housing includes plastic, silicon, rubber, or combinations thereof for preventing or reducing propagation of the second data and the regulated output voltage to the memory device.

7. The apparatus of claim 1, wherein
the antenna or the half-inductor is configured to receive second wireless signals from the user device at a later time;
the transponder is configured to convert the second wireless signals into third data and a second regulated output voltage; and
the display controller is configured to
receive the second regulated output voltage and the third data from the transponder, and
transmit second control signals to the digital ink screen causing at least some of the pixels to display a specified pigment corresponding to the received third data.

8. The apparatus of claim 7, wherein the display controller is configured to transmit a refresh signal to the digital ink screen causing the pixels to reset or refresh to remove the display of the second data and ghost artifacts before the third data is displayed.

9. The apparatus of claim 1, wherein the user device is a smartphone or a tablet computer and the wireless signals are received by the antenna or the half-inductor via at least one of near-field communication ("NFC"), radio frequency ("RF") communication, or Bluetooth®.

10. The apparatus of claim 1, wherein the memory device is a universal serial bus ("USB") flash drive, a Secure Digital™ ("SD") card, a micro-SD card, a hard disk drive ("HDDs"), or a solid-state drive ("SSD").

11. The apparatus of claim 1, wherein the micro-capsules contain three or more differently charged pigments or the pixels include different micro-capsule types that collectively provide for the display of three or more pigments or colors.

12. The apparatus of claim 1, further comprising an insulation layer or clay adhesive provided between the memory device and the display device.

13. The apparatus of claim 1, wherein the display device is removably connected to the memory device.

14. An apparatus comprising:
a case configured to receive and at least partially enclose a memory device; and
a display device mechanically coupled to or integrally formed with the case, the display device including:
a digital ink screen including pixels having micro-capsules containing at least two differently charged pigments,
an antenna or a half-inductor configured to receive wireless signals from a user device,
a transponder communicatively coupled to the antenna or the half-inductor and configured to convert the wireless signals into data and a regulated output voltage, and
a display controller configured to
receive the regulated output voltage and the data from the transponder, and
transmit control signals to the digital ink screen causing at least some of the pixels to display a specified pigment corresponding to the received data,
wherein electrical isolation is provided between the case and the display device for preventing the received data and the regulated output voltage from affecting a storage integrity or reliability of the memory device.

15. The apparatus of claim 14, wherein the case is formed from silicon, rubber, soft plastics, hard plastics, and/or combinations thereof.

16. The apparatus of claim 14, wherein the digital ink screen is at least one of electronic paper or an electrophoretic display.

17. The apparatus of claim 14, wherein
the antenna or the half-inductor is configured to receive second wireless signals from the user device at a later time;
the transponder is configured to convert the second wireless signals into second data and a second regulated output voltage; and
the display controller is configured to
receive the second regulated output voltage and the second data from the transponder, and
transmit second control signals to the digital ink screen causing at least some of the pixels to display a specified pigment corresponding to the received second data.

18. The apparatus of claim 17, wherein the display controller is configured to transmit a refresh signal to the digital ink screen causing the pixels to reset or refresh to remove the display of the data and ghost artifacts before the second data is displayed.

19. The apparatus of claim 14, wherein the display controller is configured to transmit a message to the user device indicative that the received data is shown on the digital ink screen.

* * * * *